(12) United States Patent
Pachler et al.

(10) Patent No.: US 11,030,513 B2
(45) Date of Patent: Jun. 8, 2021

(54) CHIP CARD

(71) Applicant: Infineon Technologies AG, Neubiberg (DE)

(72) Inventors: Walther Pachler, Wetzelsdorf (AT); Josef Gruber, Sankt Ruprecht an der Raab (AT); Juergen Hoelzl, Graz (AT); Francois Poensgen, Graz (AT); Stephan Rampetzreiter, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/691,623

(22) Filed: Nov. 22, 2019

(65) Prior Publication Data
US 2020/0167628 A1 May 28, 2020

(30) Foreign Application Priority Data
Nov. 23, 2018 (DE) .................... 10 2018 129 569.3

(51) Int. Cl.
G06K 19/077 (2006.01)
G06K 19/18 (2006.01)
G06K 19/12 (2006.01)
G06K 19/02 (2006.01)

(52) U.S. Cl.
CPC ....... G06K 19/07775 (2013.01); G06K 19/02 (2013.01); G06K 19/12 (2013.01); G06K 19/18 (2013.01)

(58) Field of Classification Search
CPC ................... G06K 19/07775; G06K 19/07722
USPC .................................................. 235/493, 492
See application file for complete search history.

(56) References Cited

U.S. PATENT DOCUMENTS

| 6,378,774 | B1 | 4/2002 | Emori et al. |
| 7,494,057 | B2 | 2/2009 | Lasch et al. |
| 7,588,184 | B2 | 9/2009 | Gandel et al. |
| 7,823,777 | B2 | 11/2010 | Varga et al. |
| 8,393,547 | B2 | 3/2013 | Kiekhaefer et al. |
| 8,672,232 | B2 | 3/2014 | Herslow |

(Continued)

FOREIGN PATENT DOCUMENTS

| DE | 19643357 A1 | 4/1997 |
| DE | 69831592 T2 | 6/2006 |

(Continued)

OTHER PUBLICATIONS

Horton, M.; "6 Metal Credit Cards to Consider for 2019"; 14 pages; dated Mar. 12, 2019; retrieved on Nov. 7, 2019 from https://lendedu.com/blog/metal-credit-cards/.

(Continued)

*Primary Examiner* — Allyson N Trail
(74) *Attorney, Agent, or Firm* — Viering, Jentschura & Partner mbB

(57) ABSTRACT

A chip card is provided. The chip card can have a metal layer in which an opening is formed and a slot that extends from one edge of the opening to the outer edge of the metal layer, a booster antenna structure, arranged in the opening, having an antenna section for electromagnetically coupling to the metal layer and having a coupling region for electromagnetically coupling to an antenna structure of a chip module, and the chip module, which is arranged in the coupling region, having the antenna structure arranged on the chip module.

20 Claims, 6 Drawing Sheets

(56) References Cited

U.S. PATENT DOCUMENTS

| | | |
|---|---|---|
| 8,857,722 B2 | 10/2014 | Mosteller |
| 9,016,591 B2 | 4/2015 | Herslow et al. |
| 9,070,053 B2 | 6/2015 | Mosteller |
| 9,112,272 B2 | 8/2015 | Finn et al. |
| 9,251,458 B2 | 2/2016 | Finn et al. |
| 9,475,086 B2 | 10/2016 | Finn et al. |
| 9,697,459 B2 | 7/2017 | Finn et al. |
| 9,721,200 B2 | 8/2017 | Herslow et al. |
| 9,798,968 B2 | 10/2017 | Finn et al. |
| 9,836,684 B2 | 12/2017 | Finn et al. |
| 2009/0294543 A1 | 12/2009 | Varga et al. |
| 2012/0071088 A1 | 3/2012 | Cordier |
| 2012/0325914 A1 | 12/2012 | Herslow |
| 2015/0054125 A1 | 2/2015 | Holweg et al. |
| 2015/0115039 A1* | 4/2015 | Mosteller ............ G06K 19/022 235/488 |
| 2015/0136856 A1* | 5/2015 | Herslow ................ H01Q 1/38 235/488 |
| 2015/0278675 A1* | 10/2015 | Finn ................. G06K 19/07747 235/492 |
| 2018/0157954 A1 | 6/2018 | Herslow et al. |
| 2018/0307962 A1* | 10/2018 | Lowe ............... G06K 19/07794 |
| 2019/0197384 A1 | 6/2019 | Pachler |
| 2019/0384261 A1* | 12/2019 | Nam ..................... G06K 19/02 |
| 2020/0151534 A1* | 5/2020 | Lotya ............... G06K 19/07718 |

FOREIGN PATENT DOCUMENTS

| | | |
|---|---|---|
| DE | 102013109200 A1 | 2/2015 |
| DE | 102017130940 A1 | 6/2019 |
| EP | 2431926 B1 | 5/2018 |
| WO | 2018161102 A1 | 9/2018 |

OTHER PUBLICATIONS

German Search Report based on Application No. 10 2018 129 569.3; 6 pages; dated Aug. 14, 2019 (for reference purpose only).

* cited by examiner

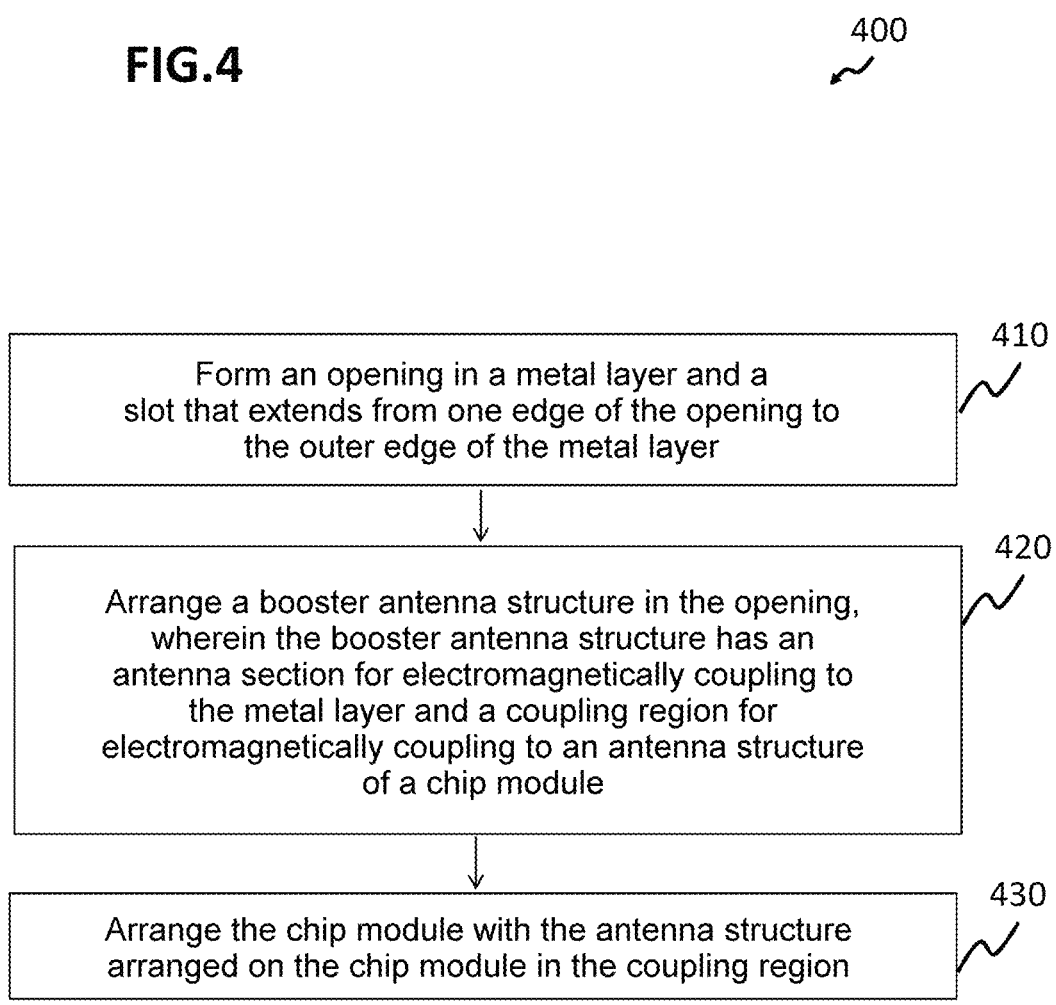

CHIP CARD

CROSS-REFERENCE TO RELATED APPLICATION

This application claims priority to German Patent Application Serial No. 10 2018 129 569.3, which was filed Nov. 23, 2018, and is incorporated herein by reference in its entirety.

TECHNICAL FIELD

Various embodiments relate generally to a chip card.

BACKGROUND

Credit cards have been used as a means of payment for more than half a century now, cardboard cards having been used as a kind of short-term credit to purchase products and services before the spread of plastic cards.

At the beginning of the 1960s, plastic cards replaced the cardboard cards, but instead of deferring the repayment period for an indefinite time, cardholders were expected to pay their invoice in full at the end of the month.

Today, consumers have the option of repaying as little of their credits as they wish and of extending the repayments for as long as they wish, which means that the plastic cards, which are now used practically everywhere in the world, have now been given serious competition.

Metal credit cards offer an appeal that plastic credit cards cannot offer, and more and more credit card manufacturers are going for that.

One reason for this is what is known as the "plunk factor", which expresses the impressive effect, producible only by metal, that arises when a metal credit card is thrown onto a counter (with the corresponding sound and metallic shimmer). In this case, the metal credit card is readily used as a status symbol, since originally metal credit cards were offered to financially strong customers, for example. In such cases, the metal used was a precious metal, for example gold or at least a gold coating, and/or an artistic design of the metal card.

Today, credit card issuers are noticing how popular metal credit cards are and are offering metal credit cards (see e.g. the metal credit card example from FIG. 1) even to average customers, however.

This trend can be seen not only in the payment sector, but also among the manufacturers of ID cards. High-priced membership cards for e.g. golf clubs, illustrious fitness centers, etc., are increasingly fashioned as luxury cards of this kind. Adding unique security features to the metal cards is a hot topic.

Cards such as the metal card 100 depicted in FIG. 1, which has a card body 106 made of metal and a chip module 104 inserted therein, are currently provided primarily as contact credit cards. That is to say that data are interchanged with a chip of the credit card by making contact with contact areas 108 integrated in a chip module, which are fashioned in accordance with ISO 7816.

It would be desirable, as an alternative or in addition, to have contactless data interchange with the chip card chip. Contactless data transmission requires an appropriate antenna to be connected to the chip card chip. An inexpensive, powerful and robust solution for such an antenna is afforded on a conventional contactless chip card by what is known as coil-on-module technology. This substantially consists of a coil-on-module chip module that has a module antenna for inductively coupling to a booster antenna arranged in the chip card body.

However, there is the issue of how to ensure good performance from the metal contactless chip card even though the additional coupling that coil-on-module technology requires means that a power loss can be expected.

SUMMARY

A chip card is provided. The chip card can have a metal layer in which an opening is formed and a slot that extends from one edge of the opening to the outer edge of the metal layer, a booster antenna structure, arranged in the opening, having an antenna section for electromagnetically coupling to the metal layer and having a coupling region for electromagnetically coupling to an antenna structure of a chip module, and the chip module, which is arranged in the coupling region, having the antenna structure arranged on the chip module.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a flowchart for a method for forming a chip card.

DESCRIPTION

Figure 1:
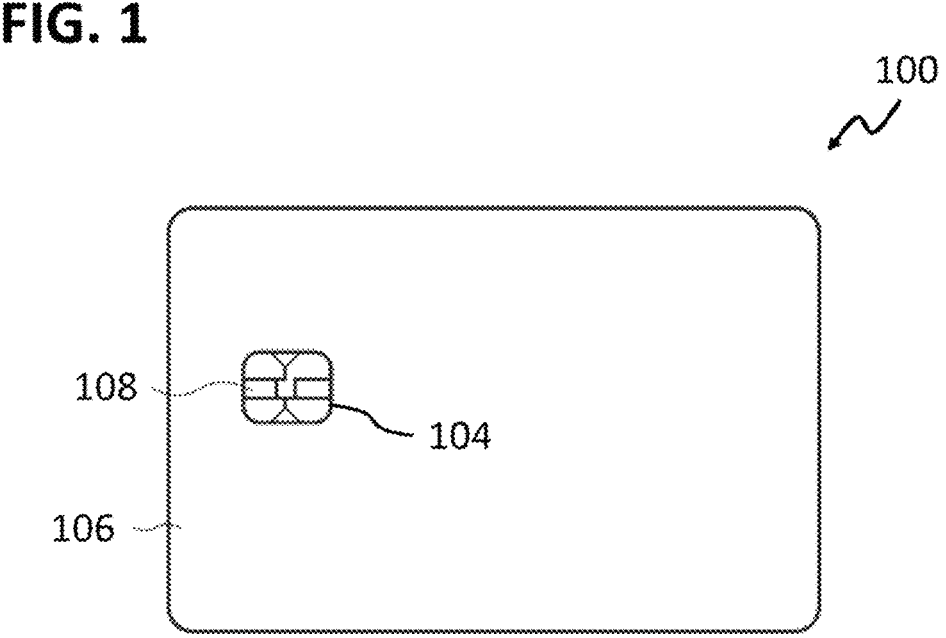
FIG. 1 shows a schematic depiction of a conventional contact-based metal chip card.

The following detailed description refers to the accompanying drawings that show, by way of illustration, specific details and embodiments in which the invention may be practiced.

In the detailed description that follows, reference is made to the appended drawings, which form part of this description and which show specific embodiments in which the invention can be executed for the purpose of illustration. In this respect, directional terminology such as "at the top", "at the bottom", "at the front", "at the rear", "front", "rear" etc. is used with reference to the orientation of the figure(s) described. Since components of embodiments can be positioned in a number of different orientations, the directional terminology is used for the purpose of illustration and is no way restrictive. It goes without saying that other embodiments can be used and structural or logical changes made without departing from the scope of protection of the present invention. It goes without saying that the features of the various illustrative embodiments described herein can be combined with one another unless specifically stated otherwise. The detailed description that follows should therefore not be regarded as restrictive, and the scope of protection of the present invention is defined by the attached claims.

In various embodiments, a chip card having a chip card body that has a metal layer is provided. The chip card can have a "dual boost antenna structure". In this case, the chip module can be in the form of a coil-on-module chip module that couples to a booster antenna in the chip card body. This booster antenna and the metal layer are designed such that they couple to one another and hence the metal layer forms a further booster antenna. An opening for receiving the booster antenna and the chip module and a slot in the metal layer, extending from the opening to the other edge, can be formed in the metal layer in this case.

The chip card in such a form can have, in various embodiments, a high level of performance and fully comply with security standards for contactless modules (EMVCo).

There can be at least two reasons for the system described above exhibiting a surprisingly high level of performance. First, tuning of the antenna (which is also frequently referred to as power matching) can be performed by means of the coupling: the coil-on-module antenna (on the chip module) and a coupling region (e.g. a coupling turn or coupling coil) of the booster antenna can be set such that a predetermined transformer winding ratio is obtained. This can be used to perform power matching for an input impedance of the chip to the impedance of the coupling region (also referred to as pickup coil) of the booster antenna. Secondly, the metal surroundings, i.e. the metal layer (which can be a substantial part of the chip card, e.g. such a substantial part that the chip card can be referred to as a metal card), can be used to increase (to "boost") the performance of the booster antenna as described above. For this, the booster antenna may be arranged very close to the metal layer. The currents induced (by the booster antenna) in the metal layer are distributed over the surface of the metal layer, whereas eddy currents in the metal layer are minimized by the slot in the metal layer. In other words, the slot and the metal area adjoining it may be in a form such that an additional booster antenna is formed.

In various embodiments, a chip card having a metal layer in or as the chip card body is provided that has a coil-on-module chip module. In this case, the metal layer, the coil-on-module chip module and the booster antenna are configured such that the metal properties of the metal layer have an advantageous effect on the booster antenna. A chip card that fully complies with the EMV standards is produced in this case, said chip card having manufacture-related deviations in the resonant frequency of the booster antenna in the region of approximately 1 MHz.

In simple terms, a metal-card/booster-antenna combination is provided in which the metal assists contactless performance.

Figure 2A:
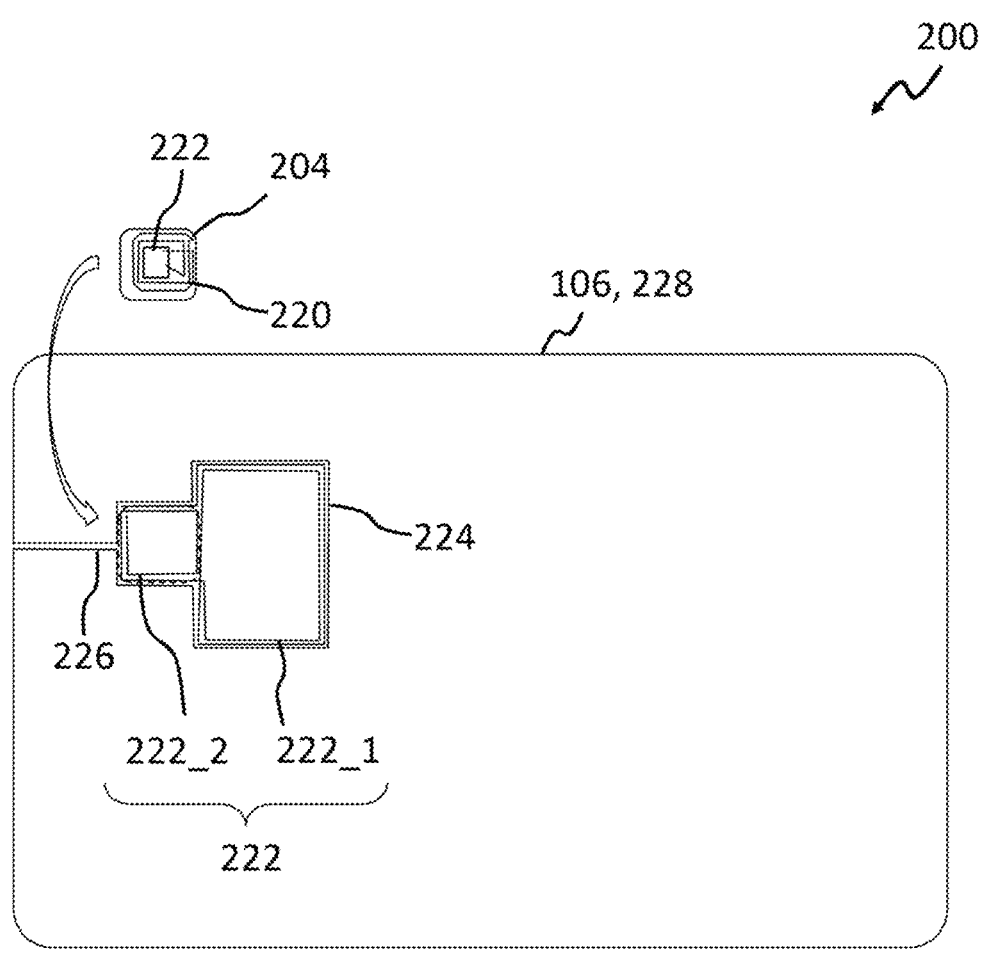
FIG. 2A shows a schematic depiction of a metal contactless chip card in accordance with various embodiments.
Figure 2B:
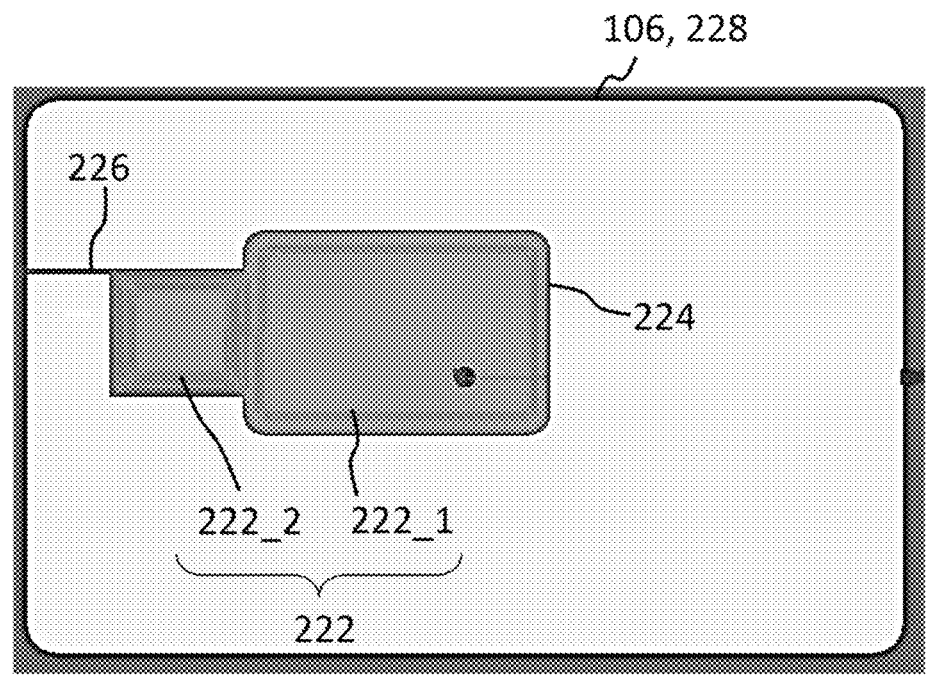
FIG. 2B shows two different schematic views of a chip card body having a booster antenna structure for the metal contactless chip card from FIG. 2C.
Figure 2B:
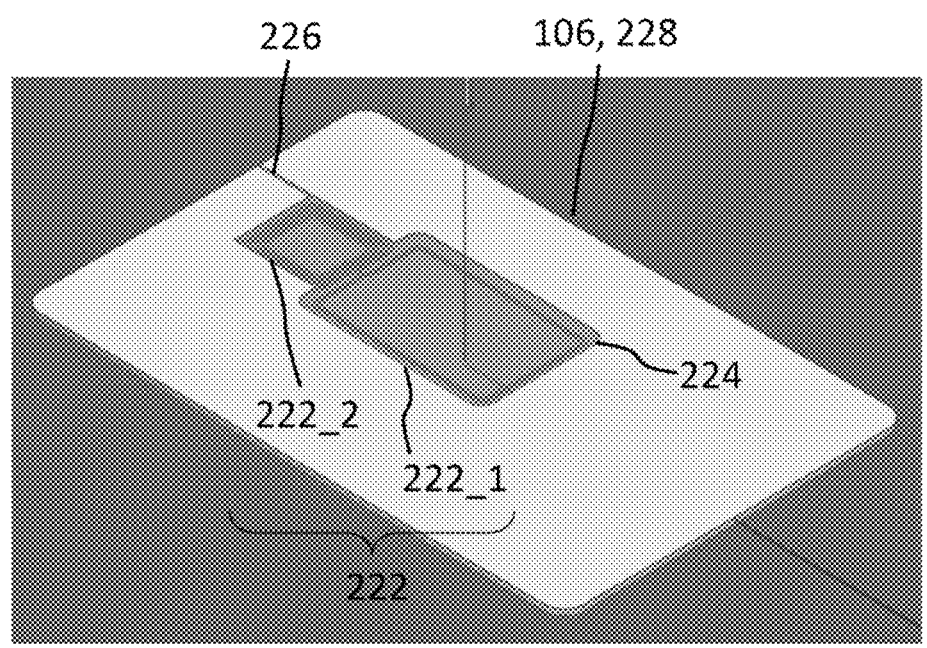
Figure 2C:
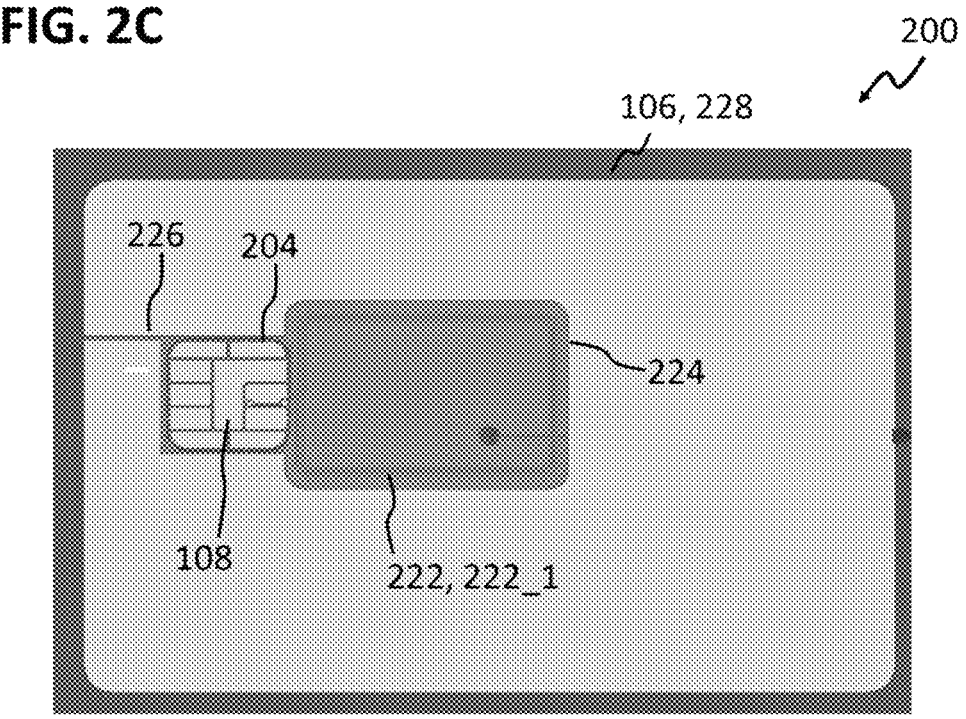
FIG. 2C shows two different schematic views of a metal contactless chip card in accordance with various embodiments.
Figure 2C:
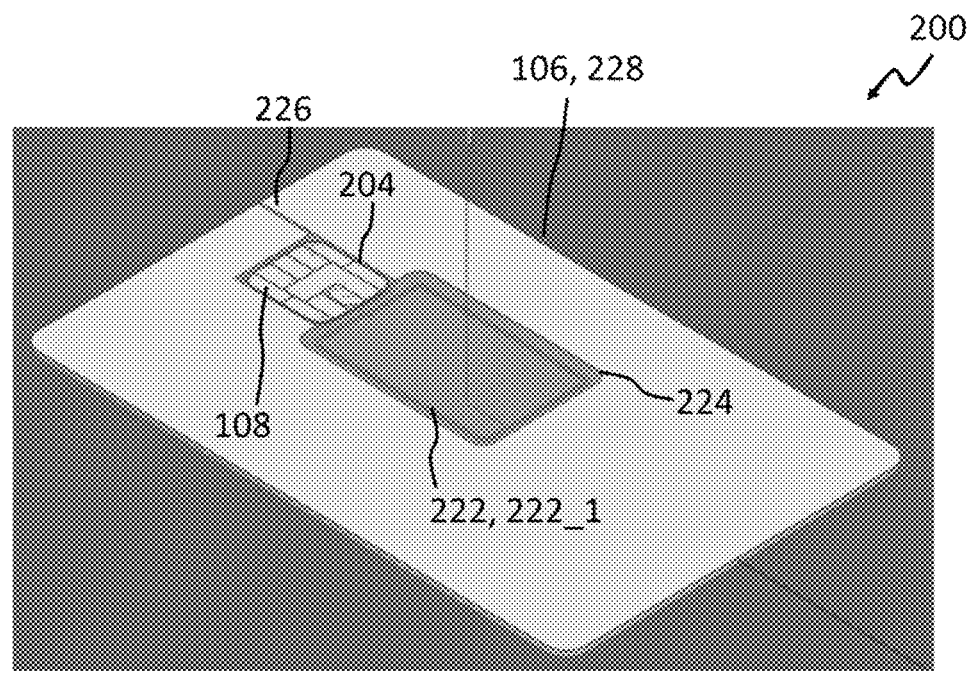

FIG. 2A shows a schematic depiction of a chip card 200 in accordance with various embodiments. FIG. 2B shows two different schematic views (top: plan view, bottom: perspective view) of a chip card body 106 having a booster antenna structure 222 for a metal contactless chip card 200, which is depicted in FIG. 2C in likewise two different schematic views (top: plan view, bottom: perspective view).

The chip card 200 can have a metal layer 228. The metal layer 228 can form or substantially form a chip card body 106 in various embodiments. By way of example, the metal layer 228 can have a thickness that is at least 90% of the total thickness of the chip card 200. The metal layer 228 can have a weight that is at least 90% of the total weight of the chip card 200.

In various embodiments, the metal layer 228 of the chip card 200 may be exposed or substantially exposed on both main surfaces. "Substantially exposed" can be understood to mean that e.g. less than 10% of a main surface is covered, e.g. less than 7%. Alternatively, the metal layer 228 may be laminated with at least one additional layer. By way of example, the chip card body 106 may have both main surfaces partially or completely laminated or one side partially laminated and the other side completely laminated, for example with a polyurethane (PU) layer.

The metal layer 228 can have an opening 224 formed in it in various embodiments. The opening 224 may be in a form such that a booster antenna structure 222 and a chip module 204 are arrangeable therein.

The metal layer 228 can have a slot 226 formed in it in various embodiments. The slot 226 can extend from one edge of the opening 224 to the outer edge of the metal layer 228. The slot 226 can be used to interrupt a continuous ring formed by the metal layer 228, as a result of which eddy currents can be avoided or suppressed. Additionally, it is thus virtually possible for the metal layer 228 to form or to have formed a further antenna.

In various embodiments, the chip card 200 can have a booster antenna structure 222, arranged in the opening 224, having an antenna section 228_1 for electromagnetically coupling to the metal layer 228 and having a coupling region 2282 for electromagnetically coupling to an antenna structure 220 of a chip module 104.

The chip card 200 can further have the chip module 204, which is arranged in the coupling region 222_2, having the antenna structure 220 arranged on the chip module 204. To allow a better overview, the chip module 204 is depicted beside the chip card body 106. A position of the coupling region 222_2 in which the chip module 204 would need to be arranged is depicted in FIG. 2A as a dashed rectangle having rounded corners.

The chip module 204 may be in the form of a conventional coil-on-module chip module 204.

The booster antenna structure 222 can be formed by an etched metal. The booster antenna structure 222 can be formed on a flexprint substrate. Alternatively, the booster antenna structure 222 can be formed by a wire, or can be formed by or from a punched metal.

In various embodiments, the metal of the booster antenna structure 222 can be a metal selected from a group consisting of: aluminum, silver, copper and an alloy of at least one of the metals listed above. In various embodiments, a different metal than those cited above or a different metal alloy can be used to form the booster antenna structure 222.

In various embodiments, the metal layer 228 can be formed from the same or identical material as or to the booster antenna structure 222. In various embodiments, the metal layer 228 can be formed from a different material than the booster antenna structure 222.

In various embodiments, the metal layer 228 and the booster antenna structure 222 can be formed or structured independently of one another, e.g. in different processes. Alternatively, the metal layer 228 and the booster antenna structure 222 can be (may have been) formed or structured in a joint process.

The booster antenna structure 222 can have at least one antenna turn in various embodiments. A distance between the outer edge of the antenna turn and the edge of the opening 224 of the metal layer 228 is no more than 500 µm, optionally no more than 300 µm, optionally no more than 200 µm, optionally no more than 100 µm, optionally in a range from approximately 50 μm to approximately 500 μm, optionally in a range from approximately 100 μm to approximately 300 μm.

A relatively short distance of this kind between the booster antenna structure and the metal layer 228 can promote coupling between the booster antenna structure 222 and the metal layer 228.

The booster antenna structure 222, the metal layer 228 and the antenna structure 220 of the chip module 204 can be arranged relative to one another such that the electromagnetic coupling between the booster antenna structure 222 (in that case the antenna section 222_1) and the metal layer 228 is less than the electromagnetic coupling between the booster antenna structure 222 (in that case the coupling region 222_2) and the antenna structure 220 of the chip module 204.

By way of example, the electromagnetic coupling between the booster antenna structure 222 and the metal layer 228 can have a coupling factor in a range from approximately 0.05 to approximately 0.35, e.g. from approximately 0.15 to 0.25.

The electromagnetic coupling between the booster antenna structure 222 and the antenna structure 220 of the chip module 204 can have for example a coupling factor in a range from approximately 0.3 to approximately 0.9, e.g. from approximately 0.45 to approximately 0.75.

Even if the booster antenna structure 222 in FIG. 2A, FIG. 2B and FIG. 2C is in a form such that the antenna section 222_1 and the coupling region 222_2 are depicted as mutually adjacent substantially rectangular antenna structures, it should be understood that the booster antenna structure 222 can also be shaped differently, for example by virtue of the antenna section 222_1 and/or the coupling region 222_2 being shaped as round structures, or by virtue of the coupling region 222_2 being arranged inside the antenna section 222_1.

Figure 3:
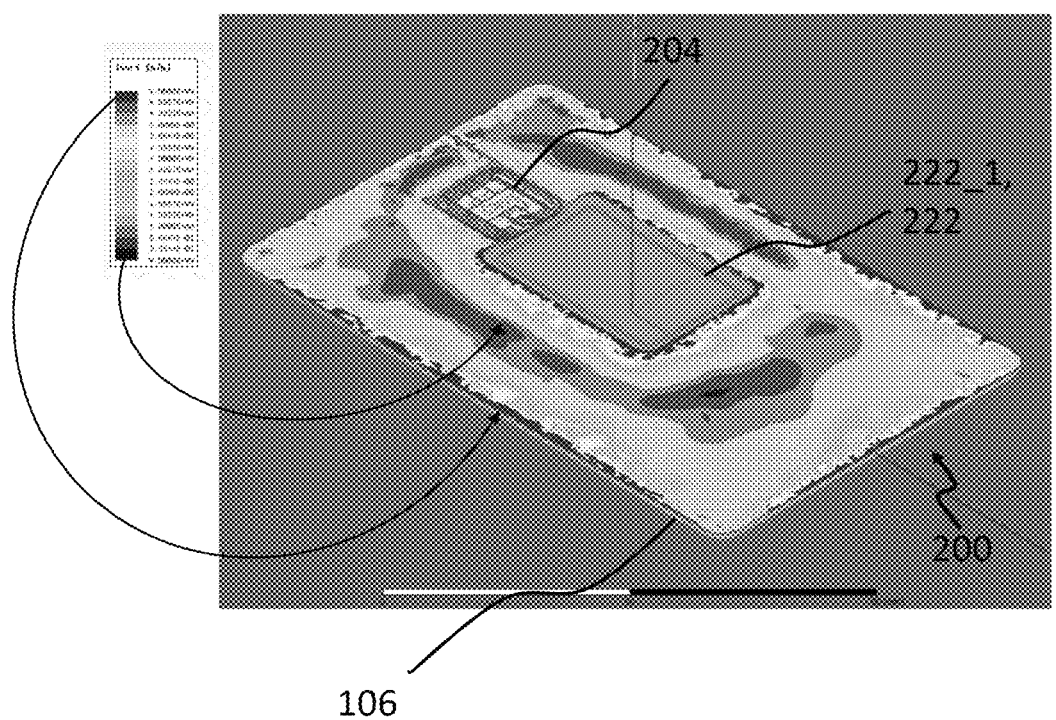
FIG. 3 shows an illustration of a simulation of currents in a metal contactless chip card in accordance with various embodiments.

FIG. 3 shows an illustration of a simulation of currents in a metal contactless chip card 200 in accordance with various embodiments.

FIG. 3 illustrates a result of a test simulation on a chip card 200 in accordance with ISO/IEC 10373 in a form as described above.

Although the original depiction of the result uses colors for illustration, the grayscale depiction using the attributing arrows for the lowest and highest current density values reveals a trend, namely from low current densities inside the area of the metal layer 228 toward higher current density values at inner and outer edges of the metal layer 228.

FIG. 3 shows that an eddy current density is low. Accordingly, a boost function of the metal layer 228 is not or only insignificantly impaired by the eddy currents, which means that the metal layer 228 can perform a dual boost function in combination with the booster antenna structure 222.

FIG. 4 shows a flowchart 400 for a method for forming a chip card.

The method can involve forming an opening in a metal layer and a slot that extends from one edge of the opening to the outer edge of the metal layer (at 410), arranging a booster antenna structure in the opening, wherein the booster antenna structure has an antenna section for electromagnetically coupling to the metal layer and a coupling region for electromagnetically coupling to an antenna structure of a chip module (at 420), and arranging the chip module with the antenna structure arranged on the chip module in the coupling region (at 430).

A few embodiments are indicated in summary below.

Example 1 is a chip card. The chip card can have a metal layer in which an opening is formed and a slot that extends from one edge of the opening to the outer edge of the metal layer, a booster antenna structure, arranged in the opening, having an antenna section for electromagnetically coupling to the metal layer and having a coupling region for electromagnetically coupling to an antenna structure of a chip module, and the chip module, which is arranged in the coupling region, having the antenna structure arranged on the chip module.

Example 2 is a chip card in accordance with Example 1, wherein the booster antenna structure is formed by an etched metal.

Example 3 is a chip card in accordance with Example 2, wherein the booster antenna structure is formed on a flex-print substrate.

Example 4 is a chip card in accordance with Example 1, wherein the booster antenna structure is formed by a wire.

Example 5 is a chip card in accordance with Example 1, wherein the booster antenna structure is formed by a punched metal.

Example 6 is a chip card in accordance with one of Examples 1 to 5, wherein the metal of the booster antenna structure is a metal selected from a group consisting of: aluminum, silver, copper and an alloy of at least one of the metals listed above.

Example 7 is a chip card in accordance with one of Examples 1 to 6, wherein the booster antenna structure has at least one antenna turn, wherein the distance between the outer edge of the antenna turn and the edge of the opening of the metal layer is no more than 500 μm, optionally no more than 300 μm, optionally no more than 200 μm, optionally no more than 100 μm, optionally in a range from approximately 50 μm to approximately 500 μm, optionally in a range from approximately 100 μm to approximately 300 μm.

Example 8 is a chip card in accordance with one of Examples 1 to 7, wherein the metal layer has a thickness that is substantially equal to the total thickness of the chip card.

Example 9 is a chip card in accordance with one of Examples 1 to 7, further having: a support, wherein the metal layer is arranged above the support and wherein the support has a cutout in which the chip module is arranged.

Example 10 is a chip card in accordance with one of Examples 1 to 7, wherein the metal layer is laminated with at least one additional layer.

Example 11 is a chip card in accordance with one of Examples 1 to 7, wherein the metal layer has a thickness that is at least 90% of the total thickness of the chip card.

Example 12 is a chip card in accordance with one of Examples 1 to 11, wherein the booster antenna structure, the metal layer and the antenna structure of the chip module are arranged relative to one another such that the electromagnetic coupling between the booster antenna structure and the metal layer is less than the electromagnetic coupling between the booster antenna structure and the antenna structure of the chip module.

Example 13 is a chip card in accordance with one of Examples 1 to 12, wherein the booster antenna structure and the metal layer are arranged relative to one another such that the electromagnetic coupling between the booster antenna structure and the metal layer has a coupling factor in a range from approximately 0.05 to approximately 0.35.

Example 14 is a chip card in accordance with one of Examples 1 to 13, wherein the booster antenna structure and the antenna structure of the chip module are arranged relative to one another such that the electromagnetic coupling between the booster antenna structure and the antenna structure of the chip module has a coupling factor in a range from approximately 0.3 to approximately 0.9.

Example 15 is a chip card in accordance with one of Examples 1 to 14, wherein the metal layer has a weight that is at least 90% of the total weight of the chip card.

Example 16 is a method for forming a chip card. The method can involve forming an opening in a metal layer and a slot that extends from one edge of the opening to the outer edge of the metal layer, arranging a booster antenna structure in the opening, wherein the booster antenna structure has an antenna section for electromagnetically coupling to the metal layer and a coupling region for electromagnetically coupling to an antenna structure of a chip module, and arranging the chip module with the antenna structure arranged on the chip module in the coupling region.

Example 17 is a method in accordance with Example 16, wherein the method further involves etching metal to form the booster antenna structure.

Example 18 is a method in accordance with Example 17, wherein the method further involves forming the booster antenna structure on a flexprint substrate.

Example 19 is a method in accordance with Example 16, wherein the method further involves forming the booster antenna structure from a wire.

Example 20 is a method in accordance with Example 16, wherein the booster antenna structure is formed by a punched metal.

Example 21 is a method in accordance with one of Examples 16 to 20, wherein the metal of the booster antenna structure is a metal selected from a group consisting of: aluminum, silver, copper and an alloy of at least one of the metals listed above.

Example 22 is a method in accordance with one of Examples 16 to 21, wherein the booster antenna structure has at least one antenna turn, wherein the distance between the outer edge of the antenna turn and the edge of the opening of the metal layer is no more than 500 µm, optionally no more than 300 µm, optionally no more than 200 µm, optionally no more than 100 µm, optionally in a range from approximately 50 µm to approximately 500 µm, optionally in a range from approximately 100 µm to approximately 300 µm.

Example 23 is a method in accordance with one of Examples 16 to 22, wherein the metal layer has a thickness that is substantially equal to the total thickness of the chip card.

Example 24 is a method in accordance with one of Examples 16 to 22, further involving: a support, wherein the metal layer is arranged above the support and wherein the support has a cutout in which the chip module is arranged.

Example 25 is a method in accordance with one of Examples 16 to 22, wherein the metal layer is laminated with at least one additional layer.

Example 26 is a method in accordance with one of Examples 16 to 22, wherein the metal layer has a thickness that is at least 90% of the total thickness of the chip card.

Example 27 is a method in accordance with one of Examples 16 to 26, wherein the booster antenna structure, the metal layer and the antenna structure of the chip module are arranged relative to one another such that the electromagnetic coupling between the booster antenna structure and the metal layer is less than the electromagnetic coupling between the booster antenna structure and the antenna structure of the chip module.

Example 28 is a method in accordance with one of Examples 16 to 27, wherein the booster antenna structure and the metal layer are arranged relative to one another such that the electromagnetic coupling between the booster antenna structure and the metal layer has a coupling factor in a range from approximately 0.05 to approximately 0.35.

Example 29 is a method in accordance with one of Examples 16 to 28, wherein the booster antenna structure and the antenna structure of the chip module are arranged relative to one another such that the electromagnetic coupling between the booster antenna structure and the antenna structure of the chip module has a coupling factor in a range from approximately 0.3 to approximately 0.9.

Example 30 is a method in accordance with one of Examples 16 to 29, wherein the metal layer has a weight that is at least 90% of the total weight of the chip card.

Further advantageous refinements of the method are obtained from the description of the apparatus, and vice versa.

While the invention has been particularly shown and described with reference to specific Examples, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A chip card, comprising:
    a metal layer in which an opening is formed and a slot that extends from one edge of the opening to the outer edge of the metal layer;
    a booster antenna structure, arranged in the opening, having an antenna section for electromagnetically coupling to the metal layer and having a coupling region for electromagnetically coupling to an antenna structure of a chip module; and
    the chip module, which is arranged in the coupling region, having the antenna structure arranged on the chip module.

2. The chip card of claim 1,
    wherein the booster antenna structure is formed by an etched metal.

3. The chip card of claim 1,
    wherein the booster antenna structure is formed on a flexprint substrate.

4. The chip card of claim 1,
    wherein the booster antenna structure is formed by a wire.

5. The chip card of claim 1,
    wherein the booster antenna structure is formed by a punched metal.

6. The chip card of claim 1,
    wherein the metal of the booster antenna structure is a metal selected from a group consisting of:
    aluminum;
    silver;
    copper; and
    an alloy of at least one of the metals listed above.

7. The chip card of claim 1,
    wherein the booster antenna structure has at least one antenna turn;
    wherein the distance between the outer edge of the antenna turn and the edge of the opening of the metal layer is no more than 500 µm.

8. The chip card of claim 7,
    wherein the distance between the outer edge of the antenna turn and the edge of the opening of the metal layer is no more than 300 µm.

9. The chip card of claim 8,
wherein the distance between the outer edge of the antenna turn and the edge of the opening of the metal layer is no more than 200 µm.

10. The chip card of claim 9,
wherein the distance between the outer edge of the antenna turn and the edge of the opening of the metal layer is no more than 100 µm.

11. The chip card of claim 1,
wherein the distance between the outer edge of the antenna turn and the edge of the opening of the metal layer is in a range from approximately 50 µm to approximately 500 µm.

12. The chip card of claim 11,
wherein the distance between the outer edge of the antenna turn and the edge of the opening of the metal layer is in a range from approximately 100 µm to approximately 300 µm.

13. The chip card of claim 1,
wherein the metal layer has a thickness that is substantially equal to the total thickness of the chip card.

14. The chip card of claim 1, further comprising:
a support;
wherein the metal layer is arranged above the support;
wherein the support has a cutout in which the chip module is arranged.

15. The chip card of claim 1,
wherein the metal layer is laminated with at least one additional layer.

16. The chip card of claim 1,
wherein the metal layer has a thickness that is at least 90% of the total thickness of the chip card.

17. The chip card of claim 1,
wherein the booster antenna structure, the metal layer and the antenna structure of the chip module are arranged relative to one another such that the electromagnetic coupling between the booster antenna structure and the metal layer is less than the electromagnetic coupling between the booster antenna structure and the antenna structure of the chip module.

18. The chip card of claim 1,
wherein the booster antenna structure and the metal layer are arranged relative to one another such that the electromagnetic coupling between the booster antenna structure and the metal layer has a coupling factor in a range from approximately 0.05 to approximately 0.35.

19. The chip card of claim 1,
wherein the booster antenna structure and the antenna structure of the chip module are arranged relative to one another such that the electromagnetic coupling between the booster antenna structure and the antenna structure of the chip module has a coupling factor in a range from approximately 0.3 to approximately 0.9.

20. The chip card of claim 1,
wherein the metal layer has a weight that is at least 90% of the total weight of the chip card.

* * * * *